Dec. 29, 1959  G. R. McMAHAN  2,919,086
SPOON REST
Filed May 10, 1957
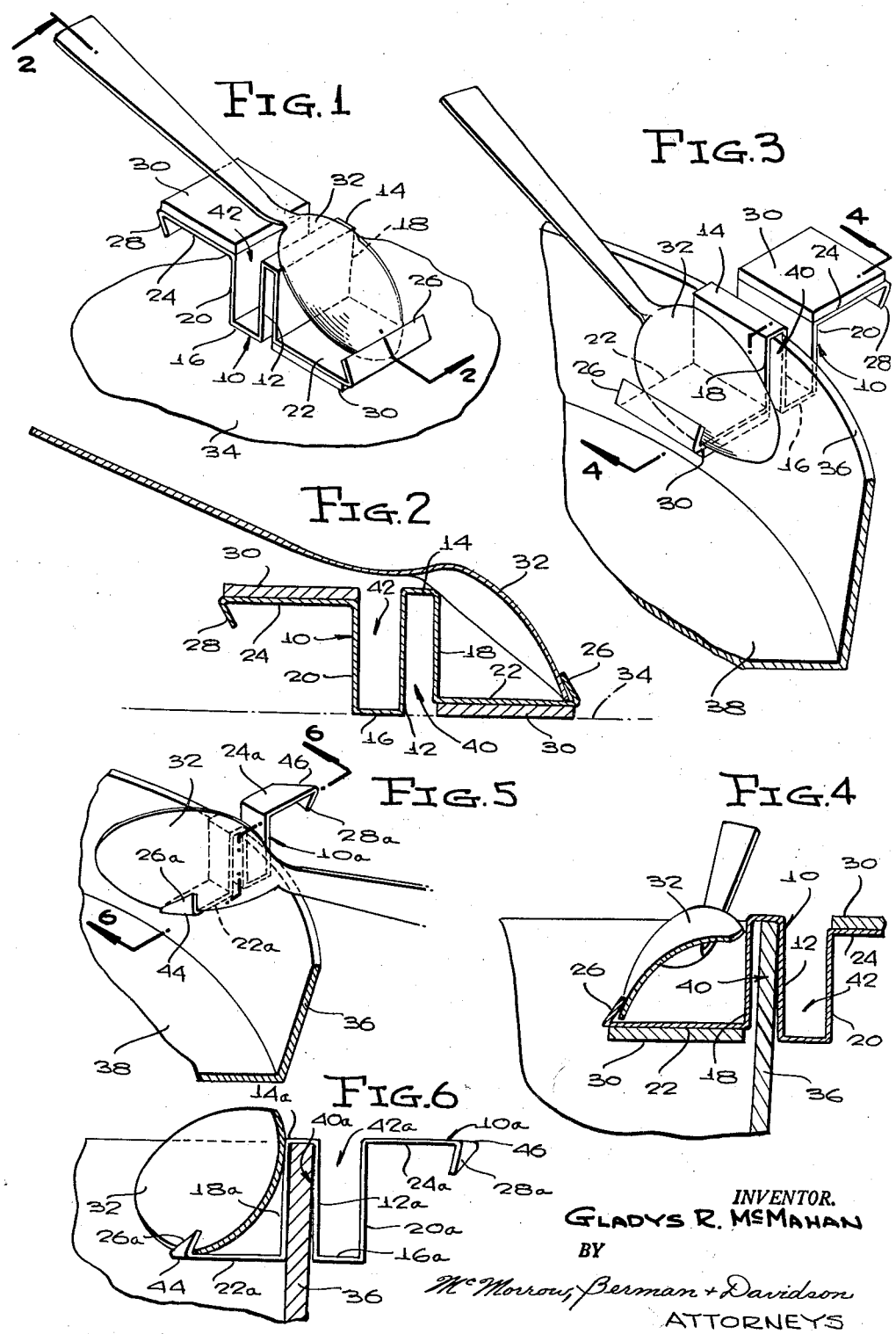
INVENTOR.
GLADYS R. McMAHAN
BY
McMorrow, Berman + Davidson
ATTORNEYS

# United States Patent Office 2,919,086
Patented Dec. 29, 1959

2,919,086
SPOON REST
Gladys R. McMahan, Palmer, Alaska

Application May 10, 1957, Serial No. 658,355

1 Claim. (Cl. 248—37.6)

This invention relates generally to holders or rests for spoons, forks, knives, and similar culinary utensils. More particularly, the invention has reference to a device of this nature that is readily attachable to any of various pans, bowls, etc., so as to support the utensil in position where it will be readily accessible when it is desired to use the same in stirring foods within the pan or receptacle.

By way of background, it may be noted that in the cooking of various foods, it is necessary from time to time to stir the foods, turn them, etc., with a spoon, fork, or related kitchen utensil. In these circumstances, it is necessary that the spoon be kept in a readily accessible location, but ordinarily this involves permitting the spoon to rest upon the stove or work table, presenting an untidy appearance that further tends to soil the surface on which the spoon is supported.

It is proposed, in view of the above, to provide a spoon or fork rest which can be swiftly attached directly to the side of the pan, so that the spoon can be readily and swiftly grasped whenever it is to be used, and can be returned, with equal speed and ease to its normal position upon the rest, awaiting its next use in stirring foods.

Another object is to provide a spoon rest as described that is particularly shaped to be supportable upon cans or bowls the walls of which may vary in thickness from one another, or which may be provided with beads or lips. In other words, the spoon rest is designed to hook over either a thin-walled pan having no lip at its top or alternatively, only a small lip or bead; or on the other hand, the device may hook over the side wall of a pan having a wide lip or bead, with the device in both instances being securely supported in position to properly hold the spoon upon the pan or equivalent receptacle.

Another object is to provide a holder of the type stated which can be reversed end for end, to locate the spoon either interiorly or exteriorly of the pan, whichever is desired.

Still another object is to permit the holder to be turned over, for the purpose of disposing in downwardly opening position either a narrow, wall-receiving slot or a wider slot that will receive a wall having a wide lip or bead.

Another object is to form the holder in a manner such that the spoon can be supported either in position extending radially of the pan with the handle projecting radially outwardly from the pan or alternatively, in a position in which the handle extends obliquely across the side wall of the pan with the spoon bowl particularly disposed for assuring, automatically, the proper drainage of any materials that may ordinarily adhere to or be confined within the spoon bowl.

Another object is to provide on the holder a magnetic means which is adapted to permit the holder to be attached, when not in use, to any surface having the capacity of being attracted to a permanent magnet, with the holder when so attached being capable of use in supporting a spoon in position with the spoon handle inclining upwardly from the support surface.

Another object is to so locate the magnetic means as to permit the same to serve as a means for attracting the spoon itself, so as to cooperate with the particular shape of the holder in maintaining the spoon in proper position upon the holder.

Other objects will appear from the following description, the claim appended thereto, and from the annexed drawing, in which like reference characters designate like parts throughout the several views, and wherein:

Figure 1 is a perspective view of the spoon holder in use, positioned upon a flat supporting surface;

Figure 2 is a longitudinal sectional view substantially on line 2—2 of Figure 1;

Figure 3 is a perspective view of the holder in position upon a pan, only a fragmentary part of which is shown, the holder being shown in use supporting a spoon in a position in which the spoon handle extends obliquely across the side wall of the pan;

Figure 4 is a sectional view substantially on line 4—4 of Figure 3;

Figure 5 is a view similar to Figure 3 showing a modified form of the holder; and Figure 6 is a sectional view substantially on line 6—6 of Figure 5.

In the form of the invention shown in Figures 1–4, the holder 10 constituting the invention includes an elongated piece of sheet metal material rectangular in blank and bent along a plurality of transverse, parallel lines to provide the holder shape shown to particular advantage in Figure 2. It may be considered, as will be noted from Figure 2, that in its final shape the spoon rest or holder has an intermediate portion formed with deep, oppositely opening, side-by-side slots having a common inner wall 12. The inner wall 12 common to both slots is integral at its opposite ends, that is, at its upper and lower extremities, with oppositely, substantially horizontally projecting bight portions 14, 16 respectively disposed in planes perpendicular to the plane of the wall 12. Bight portions 14, 16 are in turn integral with return bend portions or outer slot walls 18, 20 respectively that extend in planes parallel to that of the wall 12. It is to be noted that wall 18 is substantially closer to wall 12 than is the wall 20, for a purpose to be made presently apparent.

Projecting substantially horizontally from walls 18, 20, at the ends of such walls remote from the bight portions 14, 16, are elongated ledges 22, 24 respectively disposed in parallel planes. The planes of the ledges are also parallel to the planes of the bight portions 14, 16, that is, the planes of the ledges and bight portions are all perpendicular to the plane of the wall 12.

At the ends of the walls 22, 24 remote from the walls 18, 20, there are formed oppositely extending, re-entrant lips 26, 28 which serve as overhangs or undercut abutments for a spoon, in a manner to be described hereinafter.

In accordance with the present invention, flat, rectangular, permanent magnets 30 are secured to the outer faces of the walls or ledges 22, 24. In one embodiment, only one magnet might be employed, that is, a magnet attached either to ledge 22 or 24. It will be understood, accordingly, that the invention is considered as embracing not only a two-magnet construction as shown in Figures 1–3, but also, a one-magnet form, the latter form being considered sufficiently obvious as not to require special illustration herein.

In any event, the magnets extend over substantially the full areas of the ledges 22, 24. Therefore, when a spoon 32 is positioned as in Figures 1–4, the magnets will serve to exert a magnetic attraction upon the spoon, if the spoon be of a material that is capable of being attracted magnetically. In any event, whether or not the magnetic attraction for the spoon exists, the spoon is securely held in place by engagement of the edge of the spoon bowl under the overhanging lip of the ledge on which the spoon bowl rests, so that the handle of the spoon will be conveniently disposed outwardly from the rest, where it can be grasped by a user.

In use, the holder might be disposed as in Figures 1 and 2, with one of its magnets 30 in engagement with a flat supporting surface 34, such as the surface of a stove, metal table, etc. This would hold the spoon rest firmly in place upon the surface 34, so that with the ledge 22 faced upwardly, the spoon may be positioned as in Figures 1 and 2, with its length extending in substantial longitudinal alignment with the length of the spoon rest, the outer end of the spoon bowl engaging under the overhanging lip 26.

It will be noted, in this regard, that the outer face of the magnet is flush with the outer surface of the adjacent bight portion. Thus, the magnet 30 attached to ledge 22 has its outer surface coplanar with bight portion 16. Similarly, the outer surface of the other magnet 30 is coplanar with the outer surface of bight portion 14. This supports the device upon the surface 34 at two locations, with ledge 22 being maintained in a plane parallel to that of the supporting surface.

In Figure 3 the device is shown in use upon a pan 36, such as a frying pan having a bottom 38 and a side wall which is relatively thin and which is not provided with a lip at its upper end. This is shown also in Figure 4, and it will be noted that the different spacing of the walls 18, 20 from the wall 12 defines oppositely opening slots 40, 42 of different widths. Slot 40 is narrower, and hence would be used for receiving the relatively thin wall 36. This locates ledge 22 inwardly of the pan, in upwardly facing position, so as to be properly located for supporting a spoon 32 with the bowl of the spoon inside the pan. Drippings from the spoon thus fall back into the pan. At the same time, the spoon extends laterally from the rest, so that its handle may be disposed obliquely across the wall 36, in position to be conveniently grasped by a user.

If it were desired to use the device on a pan having a wide flange or lip at the upper edge of its side wall, or having a thick side wall, then one can reverse the device end for end and at the same time invert the same, thus to now cause slot 42 to open downwardly to receive the side wall of the pan, with ledge 24 being disposed inwardly of the pan and facing upwardly to receive the spoon bowl. Either ledge, of course, can be faced upwardly when the device is used on a flat supporting surface 34 as in Figure 2.

In the form of the invention shown in Figures 5 and 6, the modified spoon holder 10a comprises a single, relatively narrow length of sheet metal or other material having suitably heat resistant properties, shaped basically similarly to the holder 10. Thus, the modified device includes a vertical wall 12a common to a narrow slot 40a and to a wider slot 42a, and parallel to the outer slot walls 18a, 20a, with the wall 12a being connected to the outer slot walls by bight portions 14a, 16a respectively. Extending oppositely, horizontally from the walls 18a, 20a are ledges 22a, 24a integrally formed at their outer ends with return bend portions or lips 26a, 28a respectively.

The particular formation of the lips is of importance. The lips are bent along fold lines 44, 46 respectively, that extend transversely of the ledges, obliquely to the length of the ledges. Further, the lips are of triangular configuration as shown in Figure 5, having wider ends disposed more closely to the adjacent walls 18a, 20a, as the case may be, than are the smaller or narrower ends of the triangular lips.

Since the lips lie in planes disposed at an acute angle to the planes of the ledges 22a, 24a, the spoon bowl when engaged against the selected lip will be held against longitudinal movement in one direction, that is, toward the right in Figure 5, to an extent sufficient to permit the user to move the spoon into proper position, but not beyond the proper position. In other words, when the spoon is being placed in the holder, it would initially be to the left of its Figure 5 position. Then, it would be shifted in the direction of its length, and ultimately the bottom edge of the spoon bowl, when the spoon is obliquely positioned as in Figures 5 and 6, will be engaged by lip 25a with sufficient firmness to indicate that the spoon is in proper position.

Alternatively, the spoon can of course be shifted transversely of its length, that is, downwardly in Figure 5, into proper position and again the lip 26a or the lip 28a (whichever is being used at the particular time) would engage the spoon when it has reached its proper position.

In this form of the invention, the magnetic means is eliminated, but apart from this the features of the device shown in Figures 1–4 are all retained, together with particular other features described in detail above.

In both forms of the invention, the device can be manufactured very cheaply, and will be adapted to be used on pans of various types, sizes, and shapes. In every instance, the device can be reversed end for end and can be inverted, that is, turned 90 degrees about its longitudinal center line, to face either slot downwardly, as desired.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claim.

What is claimed is:

A receptacle attachment for supporting spoons and like articles comprising a length of sheet material including, medially between its ends, a pair of deep, transversely extending, oppositely opening slots having a common, wholly planiform inner wall, the slots including wholly planiform outer walls the planes of which lie parallel to the inner wall and further including bight portions connecting the inner wall to the outer walls at opposite ends of the inner wall, the bight portions being flat and lying in planes perpendicular to those of the outer and inner walls, said length of material including horizontally extending, ledge-like members on which an article may rest, said members extending from the outer walls at the ends thereof remote from the bight portions and being disposed each in a plane close to and parallel with the plane of the bight portion of the slot remote therefrom, said members terminating, at opposite extremities of the length of material, in inwardly angled lips forming abutments for the supported article, the lips extending at acute angles to the ledges adjacent thereto, and cooperating with said adjacent ledges in forming acute-angular recesses opening toward the adjacent outer walls and adapted to receive portions of articles supportable upon the ledges.

References Cited in the file of this patent

UNITED STATES PATENTS

| | | |
|---|---|---|
| 1,113,918 | Trenowith | Oct. 13, 1914 |
| 1,237,504 | Graham | Aug. 21, 1917 |
| 1,705,898 | Cannon et al. | Mar. 19, 1929 |
| 1,752,522 | Eckelman | Apr. 1, 1930 |
| 1,769,803 | Myers | July 1, 1930 |
| 2,192,569 | Williams | Mar. 5, 1940 |
| 2,457,032 | Case | Dec. 21, 1948 |

FOREIGN PATENTS

| | | |
|---|---|---|
| 446,062 | Great Britain | Apr. 23, 1936 |